United States Patent
Pyyhtiä et al.

(10) Patent No.: US 6,252,217 B1
(45) Date of Patent: Jun. 26, 2001

(54) DEVICE FOR IMAGING RADIATION (75) Inventors: Jouni Ilari Pyyhtiä, Vantaa; Markku Tapio Eräluoto, Espoo, both of (FI)

(73) Assignee: Simage Oy, Espoo (FI)

( * ) Notice: Subject to any disclaimer, the term of this patent is extended or adjusted under 35 U.S.C. 154(b) by 0 days.

(21) Appl. No.: 09/207,327

(22) Filed: Dec. 7, 1998

(30) Foreign Application Priority Data

Dec. 18, 1997 (GB) .................................................. 9726768
Oct. 26, 1998 (GB) .................................................. 9823403

(51) Int. Cl.$^7$ ................................................. H01L 27/00
(52) U.S. Cl. ........................................ 250/208.1; 348/308
(58) Field of Search ............................ 250/208.1, 214 R, 250/214 LS; 348/294, 302, 307, 308; 257/222

(56) References Cited

U.S. PATENT DOCUMENTS

| | | | |
|---|---|---|---|
| 4,654,816 | 3/1987 | Arques et al. | 364/862 |
| 5,581,301 | 12/1996 | Ninomiya | 348/342 |
| 5,583,570 | * 12/1996 | Yamada | 250/208.1 |
| 5,719,626 | 2/1998 | Yoneyama et al. | 348/301 |

FOREIGN PATENT DOCUMENTS 0 593 139   4/1994   (EP) .
WO94/30004  12/1994  (WO) .

OTHER PUBLICATIONS

Patent Abstracts of Japan, vol. 010, No. 005, Jan. 10, 1986, & JP 60 169282 A (Suwa Seikosha KK), Sep. 2, 1985.
Patent Abstracts of Japan, vol. 009, No. 110, May 15, 1985 & JP 60 000172 A 9Hitachi Seisakusho KK), Jan. 5, 1985.

* cited by examiner

Primary Examiner—John R. Lee
Assistant Examiner—Kevin Pyo
(74) Attorney, Agent, or Firm—Kenyon & Kenyon (57) ABSTRACT

An imaging device for radiation imaging is an array of image cells. The array of image cells consists of an array of detector cells and an array of image cell circuits. Each detector cell is connected to the corresponding cell in the array of image cell circuits. Each individual cell in the detector cell array generates a charge based on the radiation that hits the cell. Each cell in the array of image cell circuits accumulates the charge on a storage capacitor. The storage capacitor can be, for example, the gate of a transistor. Single cells in the array of image cells can be grouped together to form larger area super cells. The size of the super cell can be controlled by control signals, which select the operating mode. The output from a cell, a single cell or a super cell, is read out in current mode and is scaled according to the size of the cell. The read out line is pre-charged prior to read out to reduce the effect of parasitic capacitance in the read out line. Several modes can be implemented in the imaging device. Also, an imaging system for larger area radiation imaging can be implemented by connecting several imaging devices together in form of a two-dimensional array.

7 Claims, 9 Drawing Sheets

DEVICE FOR IMAGING RADIATION

FIELD OF INVENTION

This invention relates to radiation imaging using a semiconductor imaging device consisting of an array of image cells.

BACKGROUND TO INVENTION

Figure 1:
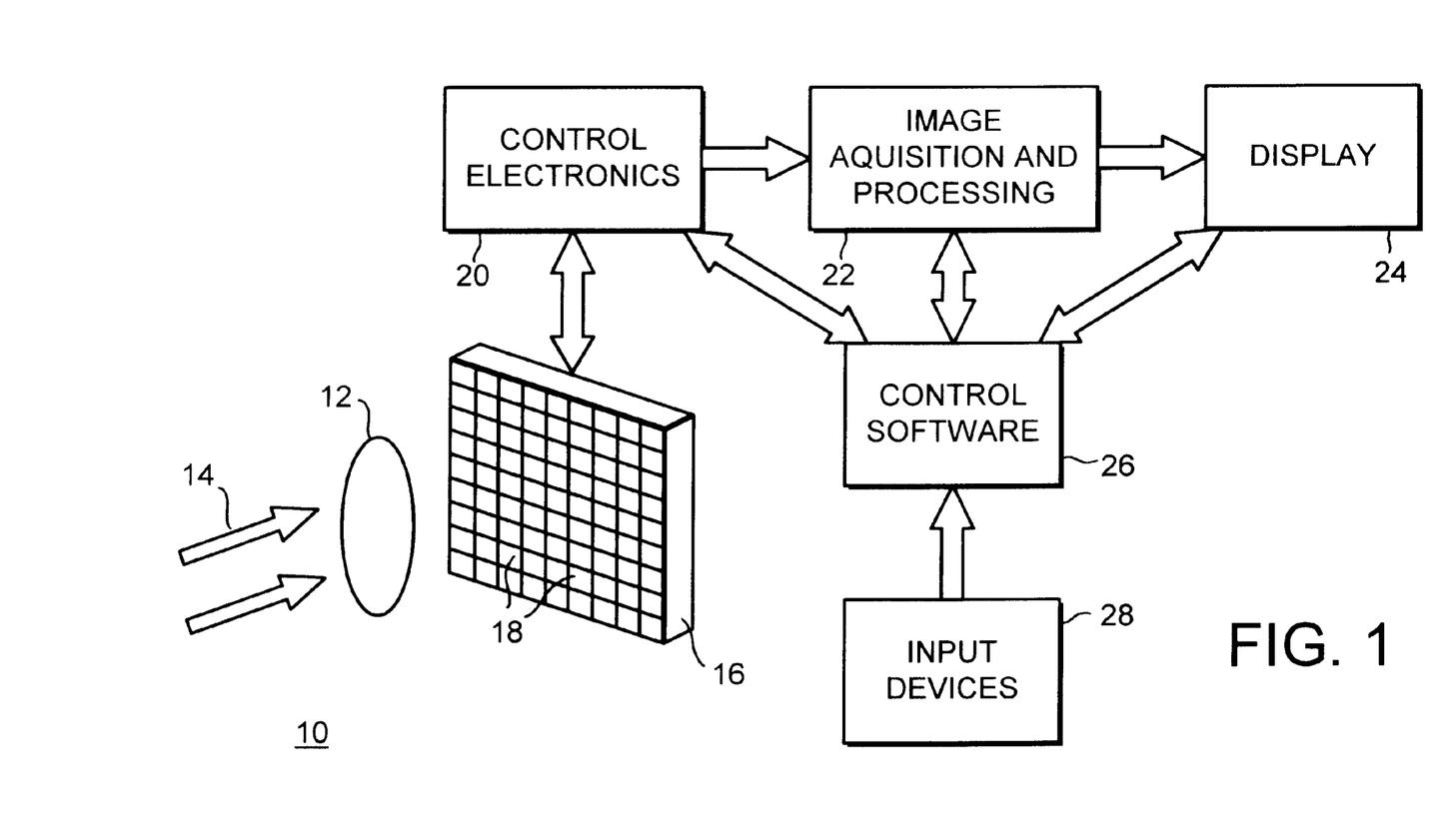
FIG. 1 shows an overall imaging system for radiation imaging.
Figure 2:
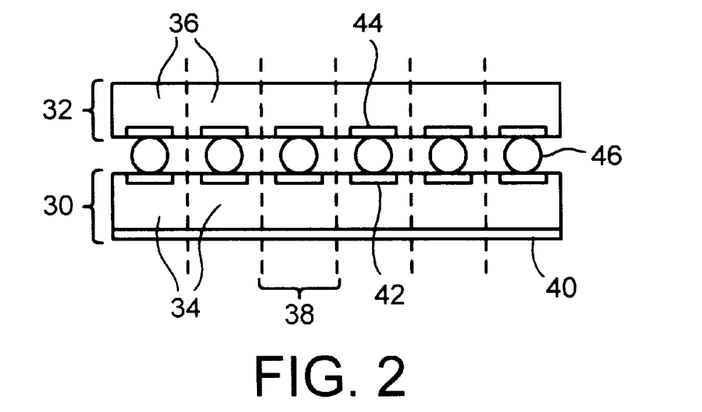
FIG. 2 depicts an example of a cross-section of an imaging device comprising of a pixel array, FIG. 3(*a*) shows a schematic diagram of one cell of image electronics.

This invention describes a semiconductor imaging device for radiation imaging. The imaging device is an array of image cells, which consists of an array of radiation detector cells and an array of image cell circuits. An example of an imaging system configuration is shown in FIG. 1 of the accompanying drawings. All cells in the detector cell array are connected to respective electronics cells in the array of image cell circuits. With appropriate processing technology, it is possible to implement both detector cells and circuit cells on the same substrate. Another possibility is to have two substrates, one for the detector and one for the cell circuits and, by using a bump-bonding or other technique connect them mechanically and electrically together so that each detector cell is connected to the corresponding cell circuit. A cross-section of a part of an imaging device made of two substrates, which are bump-bonded together, is shown in FIG. 2 of the accompanying drawings.

In many radiation imaging applications, a need for different image resolutions exist. In single exposure images, the resolution should usually be relatively high. On the other land, the same imaging system could be used for displaying live image by continuously reading the image from the imaging device and updating the display in real time. However, if the imaging system is designed for high resolution, the data bandwidth for a live image at, for example, 30 frames per second may be so high that the requirements for the readout electronics for handling the data stream may become unreasonable. A readout system fast enough to capture and process the images could become unreasonably expensive compared to the total cost of the imaging system. Furthermore, a high image resolution required for single exposure images may not even be required for a live display of images.

Therefore, a method for effectively reducing the resolution and thus the data bandwidth on chip would solve the problem. Another problem is the scalability of the imaging system for large or small area imaging systems. If single imaging devices with relatively small area could be easily linked together to form a seamlessly connected array of imaging devices for large area imaging system, the same imaging devices could easily be used for either large and small area applications.

A further problem encountered with imaging devices is that distributed capacitance associated with the on-chip read-out lines can result in current spikes during read-out resulting in longer settling times for the read-out circuitry and consequently reducing the speed at which data can be read from the imaging device.

This invention tries to solve at least one of the problems referred to above.

Particular and preferred aspects of the invention are set out in the accompanying independent and dependent claims. Features from dependent claims may be combined with those of the independent claims in any appropriate manner and not merely in the specific combinations enumerated in the claims.

SUMMARY OF INVENTION

In accordance with a first aspect of the invention, there is provided an imaging device for radiation imaging, said device comprising an array of detector cells for generating a charge in response to incident radiation, an array of cell circuits for accumulating charge generated, and control circuitry for controlling output of signals from said cell circuits, said control circuitry comprising pre-charge circuitry for reducing current spikes at an output of said device. An embodiment of the invention advantageously reduces current spikes during read-out of said device.

In a preferred embodiment, said pre-charge circuitry is adapted to charge a parasitic capacitance associated with an output for a column of cell circuits, prior to reading data from said column. Thus, the parasitic capacitance is at least partially charged, such that when a read out is initiated a reduced current level is drawn from the output circuitry.

Preferably, the control circuitry is adapted to control said pre-charge circuitry to pre-charge said capacitance one clock cycle prior to reading data from said column.

Suitably, the control circuitry further comprises switch means for controllably applying a current signal for charging said parasitic capacitance.

In a preferred embodiment, the imaging device comprises an output switch means at an output of the device, for electronically separating the output from said array of cell circuits in order to reduce the capacitance seen at said output of said device when the device is not being read.

Advantageously, signals output from said cell circuits are current signals representative of charge accumulated in said cell circuits.

In a second aspect of the invention, there is provided an imaging system comprising a plurality of imaging devices as before described.

In an embodiment of the invention, there is provided an imaging device for radiation imaging, the device comprising an array of detector cells for generating a charge in response to incident radiation, an array of cell circuits for accumulating charge generated, and control circuitry controlling output of signals from the cell circuits programmably to adjust the resolution of the imaging device.

The array of detector cells and the array of cell circuits form an array of pixels. As a result of the programmable resolution, an imaging device according to an embodiment of the invention can provide different operational modes giving different pixel resolutions for different target applications.

In a further embodiment, the programmability in that the control circuitry is arranged to select a group of cell circuits and to produce an output signal representative of a sum of charge accumulated in all cell circuits in a group. Thus, the control circuitry enables grouping of several pixels together to form a larger area super pixel for lower resolution imaging.

In a yet further embodiment the control circuitry averages signals representative of charge accumulated in all cell circuits in a group. For example, the output signal is representative of the total charge for all of the cell circuits of a group divided by the number of cell circuits in the group. Preferably, the number of cell circuits in a group is selectable from a set of possible numbers.

In a still yet further embodiment, the output signal representative of charge accumulated is a current value. The use of a current output facilitates circuitry required to combine and average signal levels.

The control circuitry, for selecting a group of cell circuits, comprises a shift register arranged to select a plurality of columns or rows concurrently and to advance in steps of more than one row or column. The control circuitry can additionally comprise logic arranged simultaneous to select a plurality of rows and columns and a step size larger than one.

The control circuitry is arranged to average currents from a group of cell circuits by connecting current outputs of each cell circuit into a common output node and dividing the resulting sum of currents by the number of pixels in the group using a current mirror. The common output node can hold a current of the selected cell circuit(s).

Alternatively, for implementing group modes, each cell circuits in a group can be arranged to produce a scaled output signal representative of charge accumulated in the cell circuit divided by a number of cell circuits in the group. In order to be operable in a plurality of group modes, where each group mode has associated with it a predetermined number of cell circuits, the cell circuits can be arranged to include an output transistor for each group mode, which output transistor produces a scaled output signal according to the number of cells in a selected group mode. The output signal from all cell circuits in the group can then be averaged by summing the signals together.

In one embodiment of the invention, the resolution is controlled from outside by one or more control signals. For example, with two control signals, four different modes for resolution can be achieved. Thus, separate enabling signals can be provided for selecting columns and rows and output signals for indicating end of row or end of column.

In an embodiment, end of row and end of column output signals of one device are connected to corresponding enabling signals of an adjacent device in first and second orthogonal directions, respectively, to form an array of imaging devices for larger area radiation imaging.

Thus, in an embodiment of the invention, in addition to a mode where every individual pixel is read, 2×2, 3×3 or 4×4 pixels could be grouped together and read out as super pixels. Other pixel combinations (for example having different numbers of rows and columns) and different number of modes can be used as well. The summation of pixel values can be easily done since the summation is done in current mode. Output currents of several cells are connected together. Adding currents from several cells together results in larger overall current. This can be compensated by an additional current mirror, which scales the current output to the same range as the current output of a single cell. In other words, the current mirror divides the current from a super pixel by the number of cells in the super pixel. This is equivalent to taking an average of a larger number of individual pixels. Using current mode output also has another advantage, enabling longer wiring without losing accuracy. Performing the averaging of pixel values is by no means limited to using current output. Voltage mode can be used instead of the current mode as described hereinafter. Using voltage mode would require the voltages of several pixels to be summed and averaged by using, for example, an opamp circuit.

Moreover, an embodiment of the invention thus provides a solution to the problem of providing a video scan output from a imaging device constructed from a plurality of readout devices. Thus rather than reading out a device at a time, a large area imaging system formed from small area readout devices can be read one line from the whole imaging area before advancing to the next row of pixels. Together the readout devices form a seamless large area imaging system enabling scanned output over the whole image area. The imaging device has two input signals, which start the sequence for selecting the column and row for output. Furthermore, the imaging device has two outputs, one of which indicate when the last pixel of each line has been read and the other indicates when the last row of the device has been read. These output signals are connected to the corresponding input signals in the adjacent imaging devices in horizontal and vertical direction. The column and row output from the last imaging device can be connected to the first device to make the system run in a continuous mode for live video applications. The mode is selectable so that the user can switch between the single exposure mode and the live video mode at any time.

The combination of the above mentioned features makes it possible to use the same system for making single exposures with high resolution and at any time switching to live video mode and at the same time changing to lower resolution to reduce the data bandwidth. The size of the pixels is not fixed to any physical dimensions, but can be scaled according to available processing technology and based on the requirements of the target application. Further, read out access time can be improved.

The invention also provides an imaging system, comprising a plurality of imaging devices according to as defined above connected as a two-dimensional array, whereby the imaging system provides selectable imaging resolutions for selected applications. Control circuitry can permit reading of cell circuits one row at a time from the two-dimensional array of imaging devices, as opposed to one imaging device at a time.

In accordance with a second aspect of the invention, there is provided a method of operating an imaging device for radiating imaging, which device comprises of an array of detector cells for generating a charge in response to incident radiation, an array of cell circuits for accumulating charge generated, and control circuitry for controlling output of signals from the cell circuits, the method comprising;

applying a pre-charge current signal to an output of said device prior to reading data from said device in order to reduce current spikes at said output.

In accordance with another embodiment of the invention, there is provided a method of operating an imaging device for radiation imaging, which device comprises of an array of detector cells for generating a charge in response to incident radiation, an array of cell circuits for accumulating charge generated, and control circuitry controlling output of signals from the cell circuits, the method comprising:

selecting a resolution of the imaging device;

adjusting addressing of the cell circuits to group outputs from the cell circuits according to a selected resolution.

BRIEF DESCRIPTION OF THE DRAWINGS

FIG. 3(*b*) shows a schematic diagram of a group of four cells of image electronics;

FIGS. 5(*a*) and 5(*b*) show a two-dimensional pixel array with control signals for selecting output pixels;

DETAILED DESCRIPTION OF EMBODIMENTS OF THE INVENTION

Exemplary embodiments are described by way of example only with reference to the accompanying drawings.

FIG. 1 shows an example of an imaging system for radiation imaging including an imaging device according to the invention. The imaging device is intended for imaging of high-energy radiation, for example X-ray radiation. However, the invention is not limited to imaging of high-energy X-ray radiation, but can be applied to detection of any type of radiation, for example a-ray, b-ray, g-ray, infra red or optical radiation, subject to choice of appropriate semiconductor substrate for the detector.

The imaging system 10 in FIG. 1 provides imaging of an object 12 subject to radiation 14. The object may, for example, be part of a human body in case of medical imaging or any other object, in case of non-destructive testing.

The imaging device 16 in FIG. 1 can consist of one or two semiconductor substrates. In case of one substrate, each cell 18 in the substrate comprises of a pixel detector and a pixel circuit. Alternatively, two substrates can be used, one containing an array of detector cells while an array of pixel circuits is located on another substrate. The two substrates can, for example, be connected using a bump-bonding or other technique, as described below.

Each detector cell on the imaging device 16 detects high-energy radiation and generates a charge, which is accumulated on a capacitor in the corresponding image cell circuit. After a certain iteration time, the charge is read out from the cell circuits as a current representative of stored charge, one cell at a time. The control electronics 20 create the necessary signals for staring the iteration and resetting the cells to a predefined value after the iterated charge has been read. The current from each cell is amplified and scaled before converting it to a digital signal, or word in the image acquisition unit 22. The digital information is further processed in the image processing unit 22 to create a desired result. For example, calibration of individual pixels can be done in the image processing unit 22 in order to compensate for the non-uniform response of pixels in the array. Process variations in fabrication of the detector array or the electronics array may lead to pixels having a non-uniform response to a uniform level of radiation. This can be compensated by post-processing of the image before displaying it on the display 24. The control electronics 20, image acquisition and processing unit 22 and the image display unit 24 can all be located inside a computer running application software 26, which controls the whole system according to user inputs via input devices 28, such as keyboard or mouse.

FIG. 2 is a cross-section of part of an imaging device. The imaging device consists of a detector substrate 30 and a readout substrate 32. In FIG. 2, the two substrates are connected together by a bump-bonding technique. The detector and readout substrates consist of an array of detector cells 34 and an array of cell circuits 36, respectively. The detector cell and the cell circuit form an image cell 38. The detection area of a detector cell 34 for the imaging cell 38 is defined between a continuous electrode 40 and by a pixel electrode 42. The continuous electrode on the detector substrate is used for applying a bias voltage. On the image electronics substrate, the contacts 44 for the pixel cells are at the corresponding locations to the electrodes on the detector substrate. A detector cell and the corresponding cell circuit are connected by means of a bump-bond 46.

The physical size of the image cell 38, consisting of a pixel detector cell 34 and corresponding circuit cell 36, is not fixed but can be designed according to the requirements of the target application and within the limits of available processing technology for integrated circuit manufacturing. Also, with an appropriate semiconductor process, detector cells 34 and the corresponding cell circuits 36 can be implemented on a same substrate. Thus, with suitable technology, the invention is applicable to single substrate implementation as well as the dual substrate technique described herein.

The material for the detector substrate 30 and readout substrate 32 can be chosen according to the application and availability of suitable processing technologies. For example, silicon can be used for both substrates. Other materials can be used as well.

For example, the detector substrate could be fabricated of CdZnTe, CdTe, HgI2, InSb, GaAs, Ge, TIBr, Si and PbI.

Figure 3A:
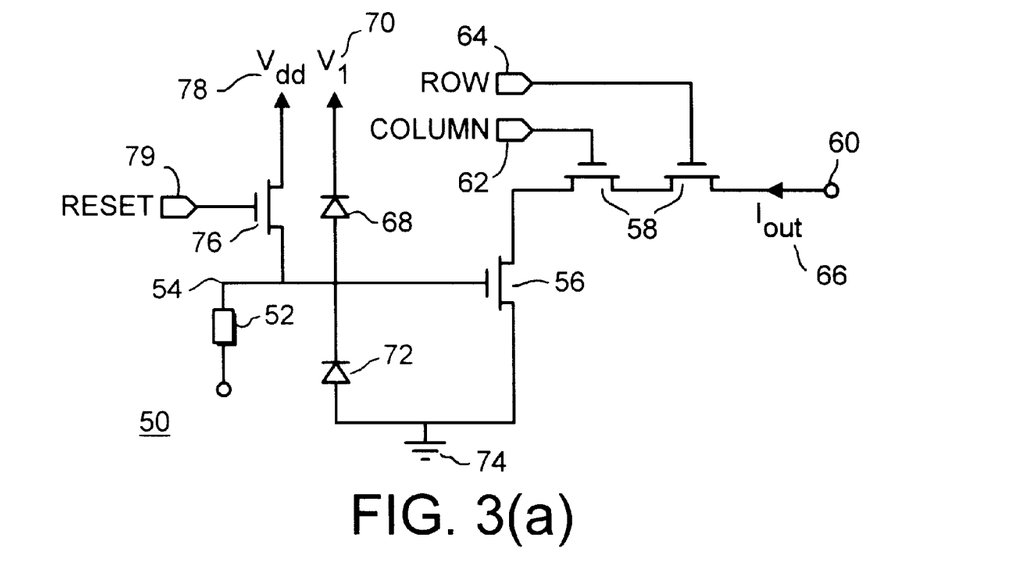

FIG. 3(a) depicts a schematic diagram of the image cell circuit 50. Each pixel or image cell in the array comprises a similar cell circuit. In FIG. 3(a), the detector cell is represented by 52. The input of the cell circuit, node 54 corresponds to the bump-bonded connection between the detector cell and the cell circuit. When radiation ionizes the detection zone in the detector, an electronic charge is created and accumulated on the gate capacitance of the memory transistor 56. Two transistors 58 are used as switches between the drain of the memory transistor 56 and the output node of the cell 60. When the column 62 and row indicator signals 64 for the cell are active concurrently, the drain of the transistor 56 is connected to the output node 60 of the cell and the drain current 66 of the memory transistor can be read out. The drain current is a function of the gate-source voltage of the transistor and thus represents the charge accumulated on the gate capacitance of the transistor 56.

Overflow of the gate voltage is protected by a diode 68 connected between the gate of the memory transistor 56 and $V_1$ 70. Similarly, underflow is protected with a diode 72 between ground (GND) 74 and the gate of the transistor 56. An additional transistor 76 is used for resetting the gate voltage of the memory transistor 56 to a predefined reset voltage value $V_{reset}$ 78 every time the reset signal 79 is active.

Figure 3B:
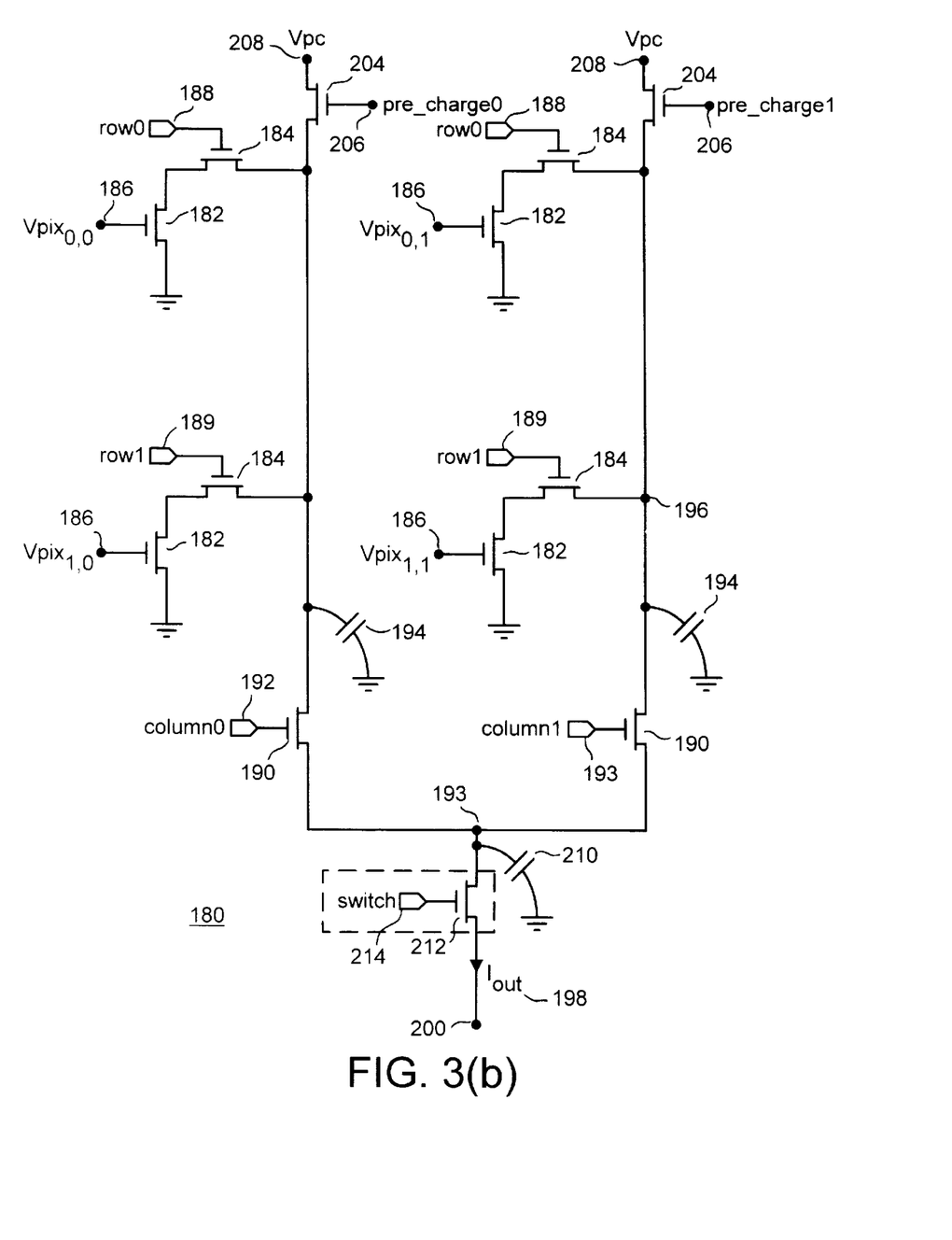

Referring now to FIG. 3(b) there is illustrated a 2×2 array of cell circuits 180. In FIG. 3(b) 4 pixels are shown connected together to form a 2 by 2 cell array. Similarly, an imaging device with a pixel array of size M×N can be constructed, where M and N can be any integer number. For simplicity and clarity, only the memory transistor 182 and the row switch 184 are shown for each cell. The gate of the transistor 182 holds the voltage value 186 representative of the charge accumulated in the cell. The row switch 184, shown in FIG. 3(b) as a transistor by way of an example, is controlled by row selecting signals 188 and 189. If the circuitry operates in a current mode, the output of each cell in the same column can be connected together. A column is then selected with the column switch 190. Column selection is controlled by the column select signals 192 and 193. Outputs of all column switches are connected together to form the current output of the cell circuit array 200.

During a read-out sequence, when a row is selected and the column selecting signal advances from one column to the next column, parasitic capacitance, schematically shown 194 at node 196, become a problem. Node 196 can be considered to represent a point on a long connector running through the imaging device chip, and therefore many parasitic capacitances are associated with it. The problem arises since when a row is selected, the node 196 for each column is drawn towards a ground potential. At the moment a column is selected, i.e. switch 190 is turned on, the parasitic capacitance at node 196 of that column begins to charge towards the potential of the current output 200. The current required to charge the node 196 has to come from the current output of the cell circuit array 200, causing a current spike at the output. This results in a longer settling time at the output of a current to voltage converter connected to the current output 200 of the imaging device. To reduce the settling time and therefore to increase the operating speed of the imaging device, a pre-charge current is applied to each column. The pre-charge current has a predefined value 204, and is applied to each column by respective switches 206. The switches 206 are controlled by the pre-charge signal 206, which is active one clock cycle before the corresponding column select signal 192 is active. Thus, the node 196 of a column is charged to the predefined value 204 via switch 206, one clock cycle prior to that column being selected.

The cell circuit array 180 can be used without the output switch 212, shown in dotted outline, at the current output 200 of the circuit. However, using a switch at the output decreases the capacitance seen at the output of the circuit 200. The switch 212 is controlled by a switch signal 214, which is active only when a device is being read. This makes it possible to connect multiple current outputs of similar imaging devices together while keeping the combined capacitance of multiple currents outputs at a level suitable for the fast read-out.

Figure 4:
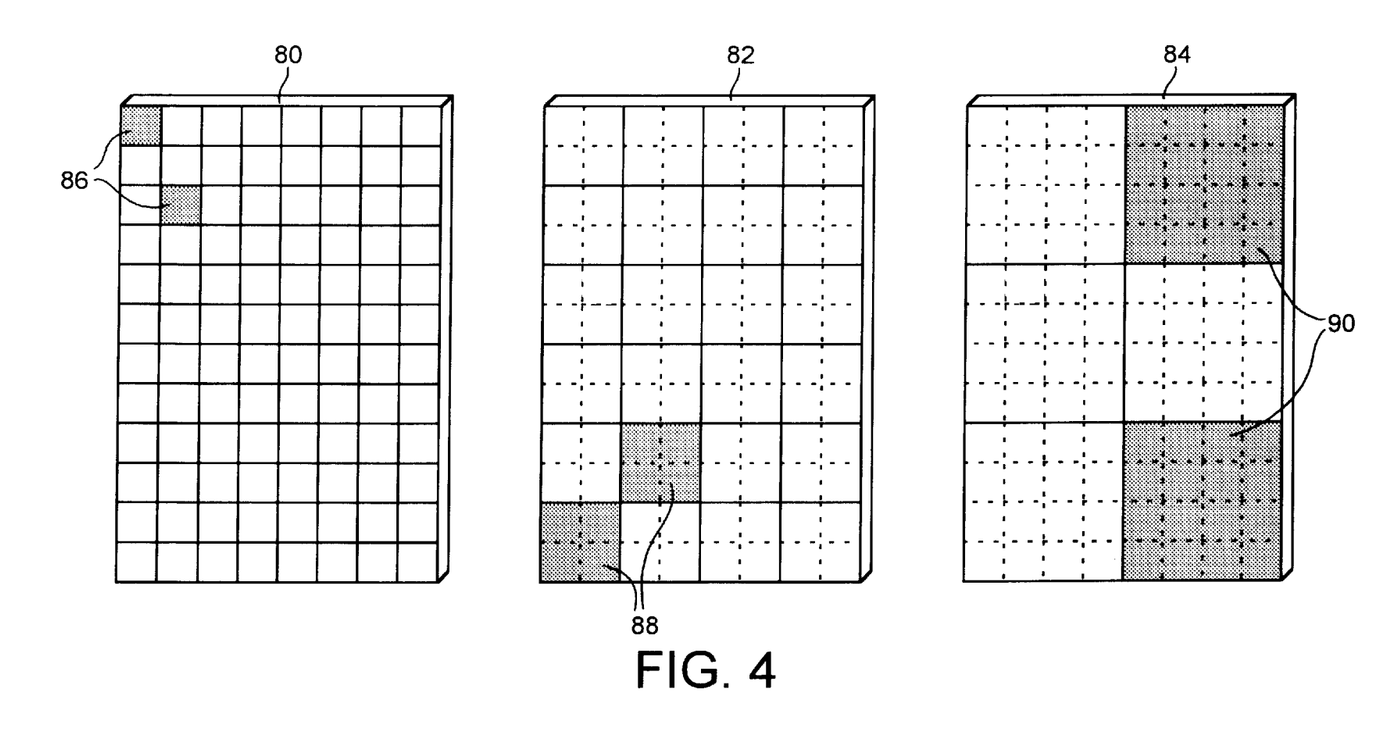
FIG. 4 illustrates the grouping of pixels into larger area super pixels.

The grouping of pixels into larger area super pixels is represented in FIG. 4. Three imaging devices 80, 82 and 84 are shown in the FIG. 4. The imaging device 80 illustrates a device with no pixel grouping. The image is read one pixel 86 at a time. Using control signals for selecting the mode of operation, the pixels in imaging devices can be grouped in to larger clusters. FIG. 4 illustrates three different modes of operation, imaging device 80 with no grouping, imaging device 82 with grouping of 2(2 pixels into one super pixel 88 and imaging device 84 with grouping of 4(4 pixels into one super pixel 90. The number of modes used in an actual application is by no means limited to the ones shown in this example but can be freely chosen according to the requirements of a particular application.

With further reference to FIGS. 3(*a*) and (*b*), if the imaging device is used in a group mode, the output currents from all the cells in the group can be summed together and divided by the number of cells in the group in order to produce an averaged output. An alternative way of implementing the same averaging is to make the division on the cell itself before summing the current outputs together. In order to do this, several memory transistors 56 having different characteristics can be implemented in each cell circuit. Thus, each cell can produce several outputs with different scaling values dependent on different group sizes. In each group mode, a different output is selected by a selection signal (not shown) according to the size of the group. The output currents from the cell circuits, which are already divided by the number of pixels in the group, is then summed to produce an averaged output.

Figure 5A:
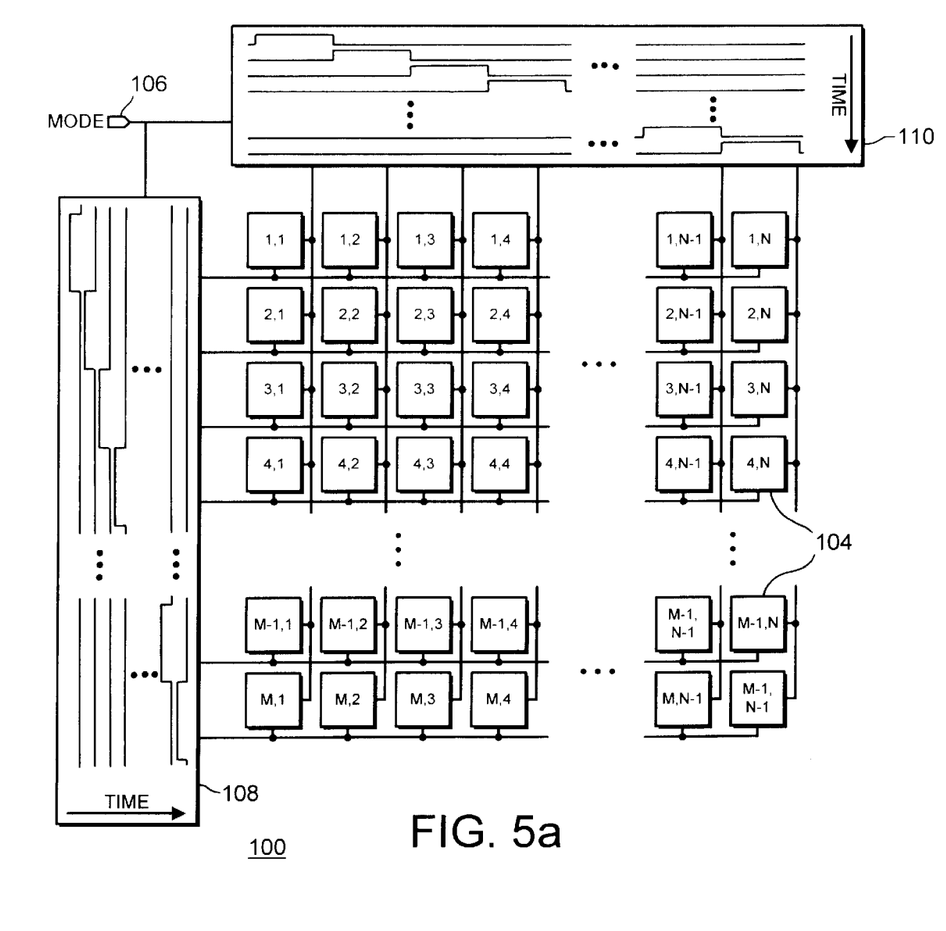
Figure 5B:
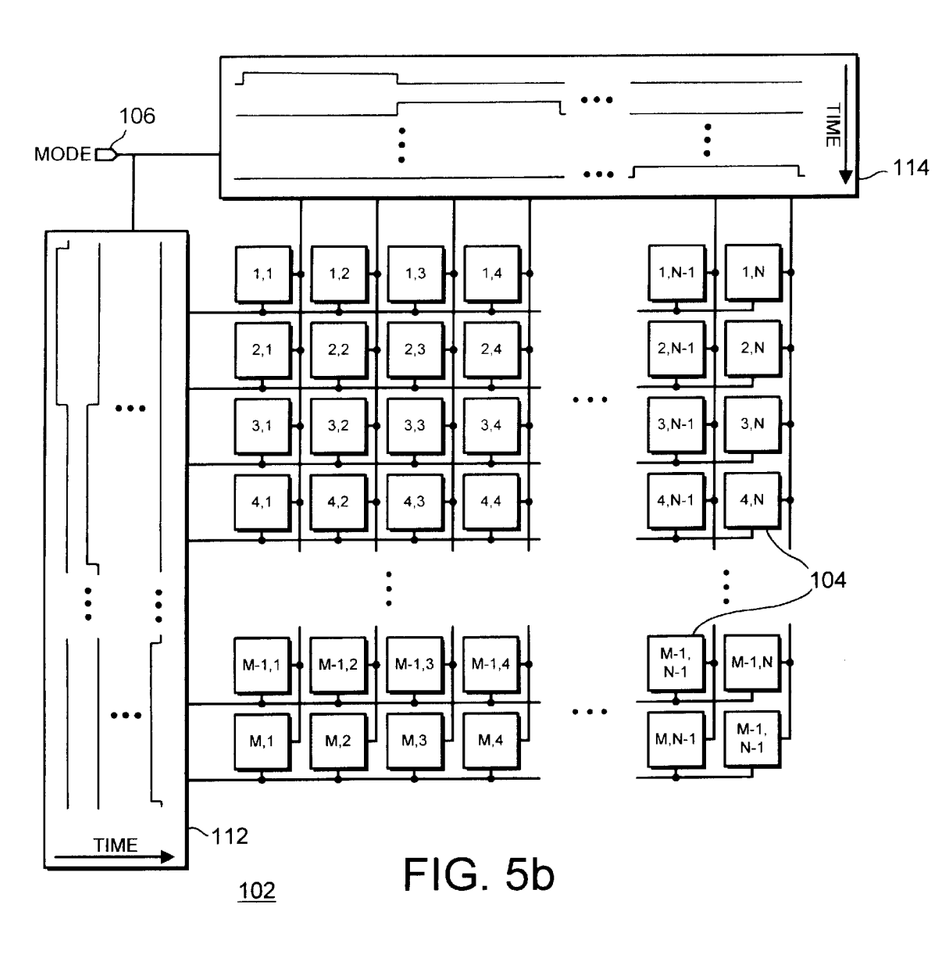

FIG. 5 illustrates two identical imaging devices consisting of a two-dimensional pixel array. Also, control signals for selecting the output pixel(s) are shown in FIG. 5. The array is of size M×N, where M is the number of pixels in vertical direction and N is the number of pixels in horizontal direction. Imaging device 100 in FIG. 5*a* uses operating mode in which every pixel is read, i.e. no grouping of pixels is used. The imaging device 102 in FIG. 5*b* is operating in a mode, which groups 2×2 pixels into one super pixel. Pixels 104 in FIG. 5 are indicated as Y, X, where X and Y represent the horizontal and vertical location of the pixel in the two-dimensional pixel array, respectively. The imaging device has control logic which generates the required signals for selecting the right column and row in the pixel array, according to the selected mode. The mode is selected with the mode signal 106. In FIG. 5*a*, the control logic 108 generates the signal, which selects one row at a time, starting from the first row. While the first row is selected, the control logic 110 generates a signal, which selects the first column. On each clock cycle, the column selector 110 advances to the next column until last column of a row is reached. When the last column of the first row is finished reading, the row selector 108 is advanced to the next row. This is repeated until last row is read. The resetting of the pixels can be done one row at a time, so that the reset signal generated for the row is the row-selecting signal delayed by one clock cycle.

The imaging device 102 in FIG. 5*b* operates in a different mode compared to the device 100 in FIG. 5*b*. In this mode two columns and two rows are selected simultaneously. The operation of the row selector 112 is identical to the operation of row selector 108 in FIG. 5*a* except for the operating mode, where two rows are selected simultaneously and the selector is advanced in two row steps. Similarly, the column selector 114 operates in the same way as the column selector 110 except for selecting two columns at a time and advancing in two column steps. The control logic for row and column selectors can be designed to include as many operating modes for grouping pixels as necessary for the target application. In this example only two modes with no grouping and grouping of 2×2 pixels were shown, but the number of built-in modes is not limited in any way. Inside the control logic boxes 108, 110, 112 and 114 in FIG. 5, the control signals are shown at various instants in time, indicating the selection of pixels. When both the column and row selector for a pixel is selected, its output current can be read in the output node of the device.

Figure 6:
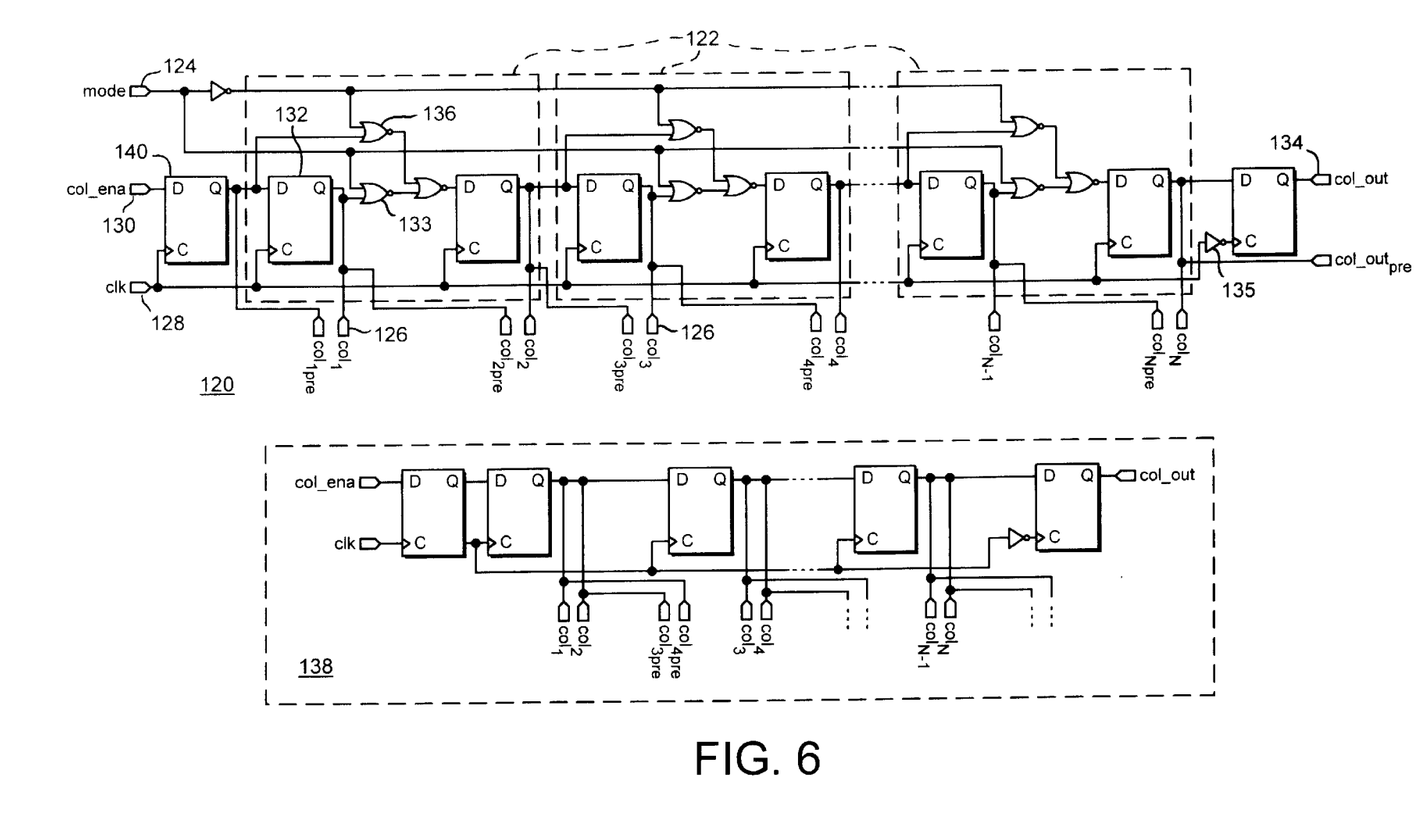
FIG. 6 shows an example of a schematic diagram used for selecting columns in a pixel array.

FIG. 6 illustrates an example schematic diagram for the control logic 120 that is used for selecting columns of a pixel array. A pixel is selected by selecting a row and a column simultaneously. The control logic 120 in FIG. 6 consists of building blocks 122, each of which contain the necessary logic for selecting one or two columns in a two column group. The building blocks form a shift register with the required logic to enable grouping of pixels. Counters or other logic, which perform the same function can be used for selecting rows or columns as well. Two modes of operation are included in the logic in FIG. 6. The two modes are: no grouping and groups of two columns. The mode is controlled by a control signal 124. When the mode signal 124 is in logic low level, the logic operates in normal mode, selecting one column 126 at a time and advancing to the next column at each clock cycle 128. The sequence is started by the col_ena signal 130. At the first clock cycle the state of the col_ena signal 130 is stored in the flip-flop 132, selecting first column. In this mode, the signal propagates through the gate 133 and the output of the first flip-flop is connected to the input of the second flip-flop. In each building block in the control logic 120, the signals are connected identically. One column is selected at a time and at each clock cycle the signal propagates to the next flip-flop selecting the next column in the chain. When the last column is selected, the control logic 120 produces an output signal col_out 134 so that one device can be connected to another to form a continuous array as explained later. The inverter 135 is added to invert the clock signal 128 in order to produce the col-out output signal at the correct time so that the sequence of selecting columns is continued in the next imaging device without delay.

If the mode signal 124 is in logic high state, the control logic 120 operates in a grouping mode where two columns are selected simultaneously and advanced two columns at a time at each clock cycle 128. In this mode the signal propagates through the gate 136 instead of gate 133, so that the input of the first flip-flop 132 is also the input for the next flip-flop. This enables the flip-flops to change state simultaneously, selecting two columns at a time. In this mode the operation of the control logic 120 is identical to the operation of the control logic 138, where the selection signals of two successive rows are connected together. When similar logic is used for selecting rows, this mode selects groups of 2×2 pixels. In this example only two modes of operation are available, but the number of modes is by no means limited to these modes. Any number and combination of different modes can be included in the row and column selecting logic using the same principle as shown in FIG. 6. The number of mode inputs depends on the number of modes included in the design.

As described with reference to FIG. 3(*b*), the pre-charge signal 206 is applied to a switch 204 for a column one clock cycle before that column is enabled or selected. The control logic 120 can be suitably adapted to provide the pre-charge signal 206 to each column switch 204 at the correct time. This may be achieved by inputting the col_ena signal 130 to D-type flip flop 132 via a further D-type flip-flop 140 shown dotted in FIG. 6. The output of flip flop 140 is the pre-charge signal for column 1, and the column select signals $col_1$, $col_2$, . . . $col_{n-1}$ then become the pre-charge signals 206 for columns $col_2$, $col_3$ . . . $col_n$ respectively.

Figure 7:
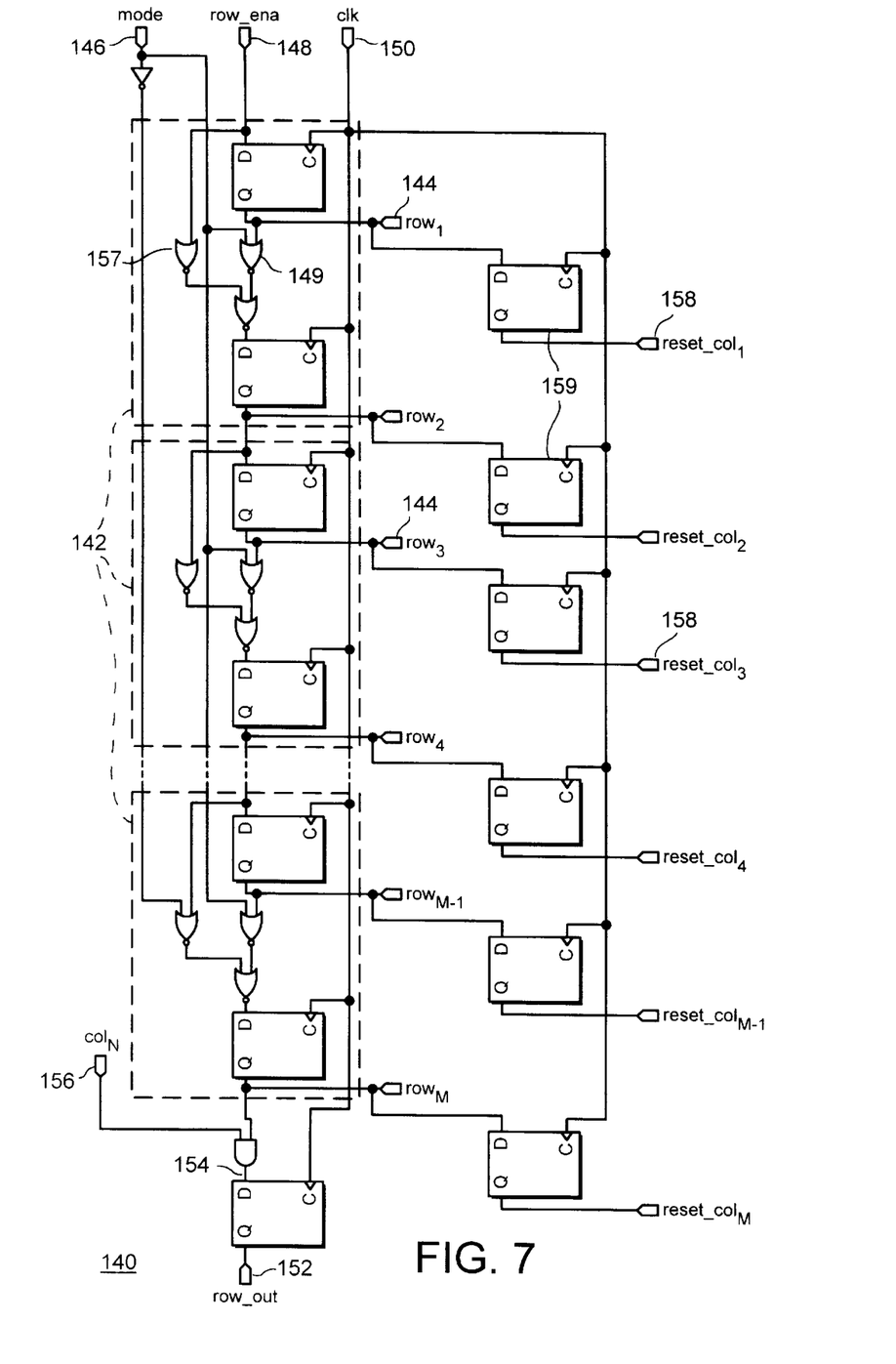
FIG. 7 shows an example of a schematic diagram used for selecting rows and resetting rows of pixels in a pixel array.

FIG. 7 illustrates an example schematic diagram for the control logic 140 that is used for selecting rows from an array of pixels. As mentioned above a pixel is selected for output when both a column and a row corresponding to the location of the pixel are selected simultaneously. The row selecting logic is similar to the one used for selecting columns but additional logic is used for resetting rows of pixels. The control logic 140 consists of building blocks 142. Each building block contains the necessary logic for selecting one or two rows 144 at a time depending on the state of the mode input 146. The row selecting sequence of the control logic 140 is started by a pulse in row_ena input signal 148. If the mode signal is in the logic low state, one row is selected at a time. In this mode the signal propagates through the gate 149 so that the output of each flip flop is connected to the input of the next flip flop. At each clock cycle the signal propagates from one flip flop to the next, selecting one column at a time. At each clock cycle 150 the next row is selected until the last row is reached. The row_out signal 152 is generated when both the last row ($row_M$) and the last column ($col_N$) are both selected. Therefore, the input to the D-flip flop producing the row out signal 152 is generated from the selection signal of the last row ($row_M$) and the selection signal for the last column ($col_N$) 156 by a logical AND gate.

If the mode signal 146 is in the logic high state, the control logic selects two rows at a time and advances in steps of two at each clock cycle 150. In this mode the selection signal propagates through the gate 157 instead of gate 149, grouping the inputs of the two flip flops in each building block together so that they change state at the same time, i.e. two rows are selected at a time. At each clock cycle, the selection is advanced at two row steps. Using same mode for rows and columns, 2×2 pixels are grouped into one super pixels when the mode signal is in the logical low state. Any number or combination of modes for selecting rows and columns can be used instead or in addition to the two modes used in 140.

The reset signals 158, which are used for resetting a row of pixels to a predefined value, are produced from the corresponding row selection signals 144 by delaying them one clock cycle using D-flip flops 159. The operating mode for grouping pixels does not effect the operation of reset logic in any way. If grouping is used, several rows of pixels are reset simultaneously.

Figure 8:
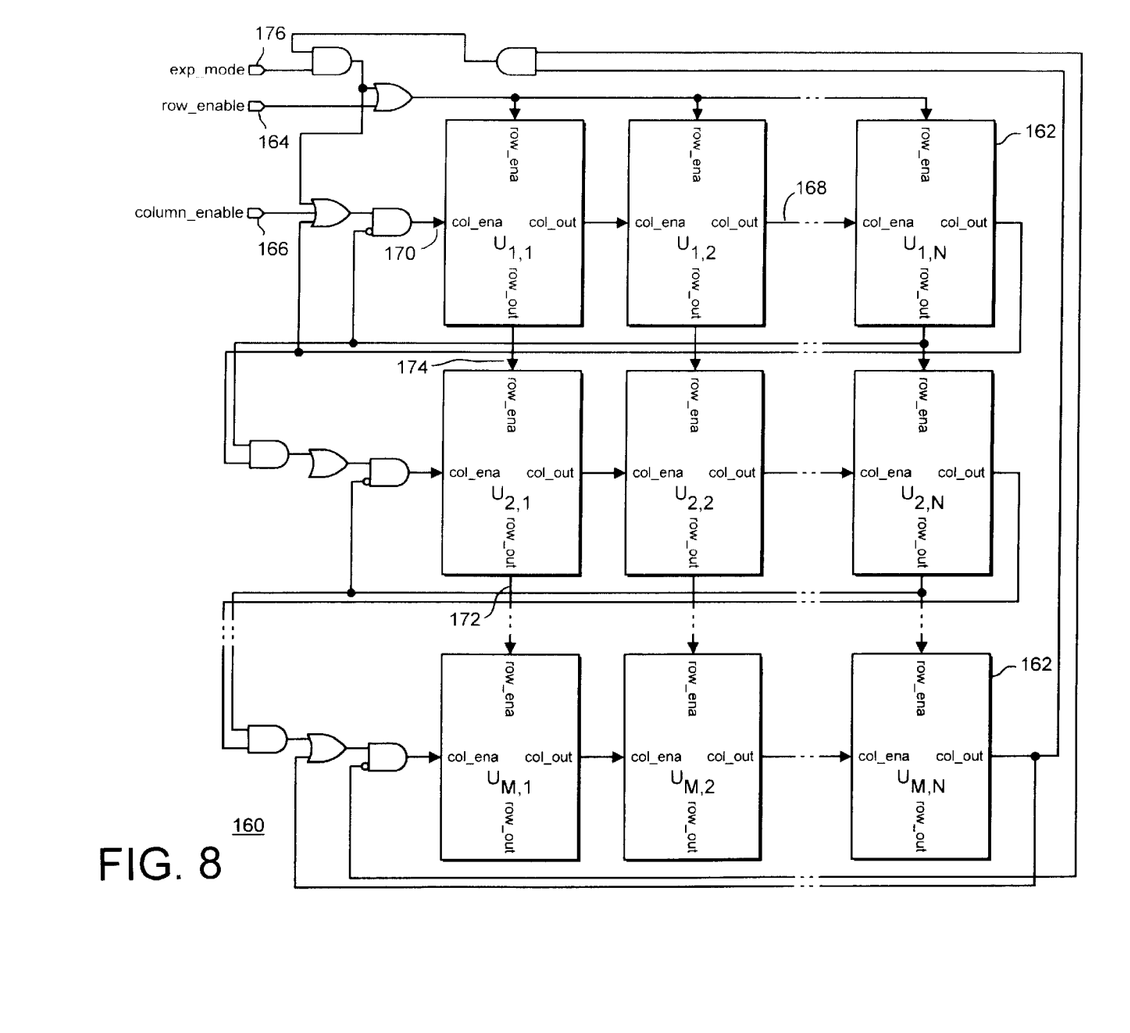
FIG. 8 illustrates imaging system consisting of an array of imaging devices and with two modes of operation: single shot and continuous.

FIG. 8 shows an example of an imaging system 160 consisting of an array of imaging devices. The array consists of M×N imaging devices, connected together to form a continuous imaging area. Each imaging device 162 in the array of imaging devices includes the logic for programmable resolution described above. This example illustrates the connections between devices 162 using the enable and out signals for rows and columns, which are available in each imaging device. The imaging system is started using the row_enable 164 and column_enable 166 signals. Once started, the first row and the first column of the first imaging device, marked $U_{1,1}$, is selected for output. The column selector advances at each clock cycle and when the last column of the first row is read, a col_out signal 168 is produced. The col_out signal 168 is connected to the col_ena input 170 of the next device in the array. The reading of pixels is continued from the first row of the next device and so on until the last pixel in the first row of the whole imaging area is read. The col_out signal 168 of the last imaging device in each row is connected back to the first device in the same row, as shown in FIG. 8, and the row selector is advanced. The following rows are read in the same way until last row of the imaging device is reached and the row_out signal 172 is given a pulse enabling the first column in the next device in vertical direction. The row_out signal 172 of each device is connected to the row_ena signal 174 of next device in vertical direction. Each time the row selector is advanced to the next row, the previously selected row is reset. The whole area in the array of imaging devices is read using the same method. At the moment the last pixel in the whole area is read and a pulse is present at the col_out signal 168 and row_out signal 172 of the last device, marked $U_{M,N}$, the sequence is started from the beginning provided that the exp_mode signal 176 is in a logic high state.

The exp_mode signal 176 controls the running mode of the array. With the exp_mode signal 176 in low state, the system operates in single exposure mode reading the whole image area once. New row_enable 164 and column_enable 166 signals are required for starting another reading sequence. On the other hand, the same system can be used for continuously updating live video image by applying logic high level to the exp_mode signal 176. As long as the exp_mode signal 176 remains high, the reading sequence is started from the beginning once the last pixel in the whole area is reached.

In addition to the inputs shown in the FIG. 8, clock input and the mode inputs for selecting the resolution are required, but for simplicity they are not shown in this example. Each of the imaging devices also includes the necessary circuitry for the programmable resolution described earlier. In case of using grouping of pixels for lowering the resolution, the read sequence is identical to the one described above except for the fact that several columns and rows are selected simultaneously and advanced in steps larger than one pixel according to the size of the pixel group.

The imaging system in FIG. 8 can also be divided into two or more sections, each consisting of an array of imaging devices. In such arrangement each section is connected in the same way as described above for the whole imaging area. Such an arrangement produces more than one simultaneous output channels instead of just one.

An imaging device for radiation imaging system has been described. The imaging system consists of an array of several imaging devices. The number of devices in the array can be chosen according to the requirements of the target application, whether it is a small area system or a large area system. An imaging device as described herein has a capability to change the resolution of the device while the system is operating. The grouping of pixels into larger area super pixels is achieved by selecting several pixels at the same time. A pixel is selected when the row and column corresponding to the location of the pixel are selected simultaneously. With the method of operation explained herein, several columns and rows can be selected concurrently, thus selecting a group of pixels instead of just one. The grouping of pixels has the advantage that the same system can be used for high-resolution still images as well as for lower resolution video applications. By grouping pixels directly in the imaging device, the amount of data is significantly reduced. Also, the speed and memory requirements for the image acquisition and processing system are reduced considerably.

The imaging device described herein can easily be applied for small and large area applications by connecting the end of row and end of column signals to the corresponding row enable and column enable signals on the next device in the array in read order.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What we claim is:

1. An imaging device for radiation imaging, said device comprising an array of detector cells for generating a charge in response to incident radiation, an array of cell circuits for accumulating charge generated, and control circuitry for controlling output of signals from said cell circuits, said control circuitry comprising pre-charge circuitry for charging parasitic capacitance of an outline for a plurality of cell circuits prior to reading data from said output line for reducing current spikes at an output of said device.

2. An imaging device according to claim 1, said control circuitry adopted to control said pre-charge circuitry to pre-charge said capacitance one clock cycle prior to reading data from said column.

3. An imaging device according to claim 1, said control circuitry further comprising switch means for controllably applying a current signal for charging said parasitic capacitance.

4. An imaging device according to claim 1, comprising output switch means at an output of the device for electronically separating the output from said array of cell circuits in order to reduce the capacitance seen at said output of said device when said device is not being read.

5. An imaging device according to claim 1, wherein said signals output from said cell circuits are current signals representative of charge accumulated in said cell circuits.

6. An imaging system comprising a plurality of imaging devices according to claim 1.

7. A method of operating an imaging device for radiation imaging, which device comprises of an array of detector cells for generating a charge in response to incident radiation, an array of cell circuits for accumulating charge generated, and control circuitry for controlling output of signals from the cell circuits, the method comprising;

applying a pre-charge current signal to an output of said device for charging parasitic capacitance at the output prior to reading data from said device in order to reduce current spikes of said output.

* * * * *

UNITED STATES PATENT AND TRADEMARK OFFICE
CERTIFICATE OF CORRECTION

| | | |
|---|---|---|
| PATENT NO. | : 6,252,217 B1 | Page 1 of 1 |
| APPLICATION NO. | : 09/207327 | |
| DATED | : June 26, 2001 | |
| INVENTOR(S) | : Jouni Ilari Pyyhtia, Markku Tapio Eraluoto and Stefan Jurthe | |

It is certified that error appears in the above-identified patent and that said Letters Patent is hereby corrected as shown below:

On the Title Page, Item (75) The inventorship should be corrected as noted above to: Jouni Ilari Pyyhtia, Markku Tapio Eraluoto, and Stefan Jurthe.

Signed and Sealed this

Twenty-first Day of June, 2011

David J. Kappos
*Director of the United States Patent and Trademark Office*